3,321,514
Patented May 23, 1967

3,321,514
SYNTHESIS OF ORGANIC AMINO COMPOUNDS
John L. Eisenmann, Hingham, Mass., assignor to Ionics, Incorporated, Cambridge, Mass.
No Drawing. Filed Mar. 12, 1964, Ser. No. 351,545
2 Claims. (Cl. 260—534)

This invention concerns the preparation of organic compounds containing nitrogen and in particular to the sythesis of β-amino derivatives of carboxylic acids containing alkyl or aromatic radicals. More particularly, the invention relates to the preparation of derivatives of β-aminopropionic acid (β-alanine) by employing a catalyst of a metal carbonyl for reacting together ethylenimine (dimethylenimine), carbon monoxide, and compounds having easily replaceable hydrogen atoms. Any substance which functions to give up hydrogen may be employed but the most suitable ones are water, alcohols, amines, mercaptans, and hydrogen itself.

The processes of this invention are adaptable to commercial-scale production and will produce economic yields of the desired products. In general, the products of the invention may be used as chemical intermediates such as monomers, plasticizers, and cross-linking agents for the preparation of plastics. While the amino derivatives of carboxylic acids of the character as set forth above, and particularly β-aminopropionic acid have previously been prepared by other methods, none of these methods lead to their preparation in the unique manner of the present invention. Since β-alanine is an important intermediate in the synthesis of pantothenic acid, which is a vitamin of the B-complex group, a practical commercial process for the preparation of this intermediate is most valuable.

Accordingly, the object of the invention is to provide an efficient process for preparing amino derivatives of carboxyl acids from organic compounds containing at least one heterocyclic ethylenimine structure linked thereto.

Another object is to produce β-alanine from ethylenimine with a minimum of side reactions and in reasonably economic yields.

Another object is to employ a metal carbonyl catalyst to produce satisfactory yields of the desired product.

Further objects of the invention will be apparent from an examination of the following description and claims.

The present invention is based upon the discovery that ethylenimine can be converted into β-aminopropionic acid by reacting the same with carbon monoxide, water, and a metal carbonyl catalyst, at a temperature of about between 80° C. to 300° C. at pressure of about between 800 to 8,000 lbs. per square inch. By varying the temperature and pressure the process may be applied to producing a wide variety of β-amino acids derived from the ethylenimine or substituted derivatives of ethylenimine as the starting material. Thus, under the proper conditions, the higher homologs of β-aminopropionic acid such as β-aminocaprylic acid may be synthesized. Compounds containing the ethylenimine ring structure may be reacted with a mercaptan, CO and a catalyst to produce β-amino thiolesters of carboxylic acids. The reaction with an alcohol, CO and a catalyst will produce β-amino esters such as the alkyl β-aminopropionates or higher homologs such as the alkyl β-aminononylates. Similarly, the reaction of ethylenimine or its derivatives with an amine may, under controlled conditions, yield amides of β-amino carboxylic acids.

It has not been proven that any one mechanism is applicable to all processes of the invention and their is no intention that this invention will be in any way limited by a discussion of the most probable mechanism. In order to illustrate what constitutes the basis of the reactions, the following mechanism is preferred:

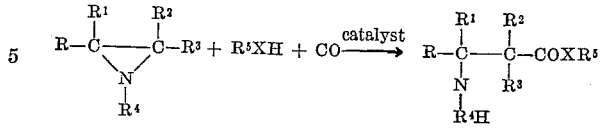

Where X represents O, S or NR⁶ and where R, R¹, R², R³, R⁴, R⁵, and R⁶ are either hydrogen or organic radicals which may permissibly contain further imino linkages

but which are simply aliphatic or aromatic groups or substituted aliphatic or aromatic derivatives. If an R contains unsaturation, the condensation of the carbon monoxide will occur to some degree on the unsaturated bond.

It is also within the scope of the invention to employ hydrogen per se as the hydrogen donor. Such a reaction with ethylenimine or compounds containing the ethylimine ring structure will produce β-amino aldehyde products such as for example β-aminopropionaldehyde.

The reaction illustrated in the above equation can be pictured as proceeding by means of the addition of hydrogen from the hydrogen donor compound R⁵XH onto the nitrogen of the imino linkage while the remaining portion R⁵X—, together with the carbon monoxide, adds on to one of the carbon atoms of the imino linkage. Thus, possible isomeric products may be formed depending on which nitrogen-carbon linkage of the imino structure is broken. The conditions of temperature, pressure and catalyst will influence the product formed; that is, the product most favored by the conditions employed will be produced in the highest yield.

The above equation illustrates that the reactants combine in equimolar amounts but it is generally desirable that one or more of the reactants be present in excess to increase the rate of reaction. Although carbon monoxide and R⁵XH combine in equal molar amounts, an excess of either can be employed up to a ratio of about 25:1 for the carbon monoxide or up to about 5:1 for the hydrogen donor compound.

The heterocyclic nitrogen containing compounds which may be used as the starting material in the practice of this invention may be any of the three member ring compounds having the general ethylenimine structure

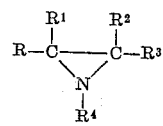

Wherein the R's represent hydrogen or organic radicals, which may contain further ethylenimine linkages but which are generally aliphatic or aromatic groups. In the preferred embodiment the R's represent hydrogen, alkyl or phenyl groups. While the preferred embodiment of the invention will be illustrated in particular to a starting material of ethylenimine, it is to be understood that the ethylenimine derivatives are broadly applicable herein. However, because of the superior results obtained, it is desirable to employ aliphatic nitrogen containing compounds having the three-ring imino structure wherein the R's are simple hydrogen or the lower alkyl groups. As an illustration of a few of the useful starting compounds within the above-mentioned formula, mention may be made of ethylenimine per se, alkyl substituted ethylenimines such as 2-methylethylenimine, 1-ethylethylenimine and 2,2-dimethylethylenimine; aryl substituted ethylenimines such as 1,2,3-triphenylethylenimine or 2-phenylethylenimine. Ethylenimine derivatives containing olefinic unsaturated functional groups such as 1-vinylethylenimine may also be used in the reaction. Other more complicated compounds may be employed as a starting material but, as a rule, the yields tend to be smaller as the ethylenimine structure containing compounds become more complicated.

The alcohols used as hydrogen donors for the synthesis of the alkyl β-aminopropionates or the higher homologs are in general, methanol, ethanol, and the higher aliphatic alcohols. The use of aryl alcohols such as benzyl alcohol may be used for preparing aryl β-aminopropionates. When mercaptans and amines are used as the source of hydrogen for effectively preparing thioesters and amides respectively, it is preferred they be restricted to the simpler types. The reaction will not occur without the presence of a soluble metal carbonyl catalysts which may be the carbonyls of cobalt, rhodium, or iridium. The carbonyl compounds exert a profound effect upon the reaction even when present in minute amounts. It has been found that the cobalt carbonyls, and in particular dicobalt octacarbonyl $Co_2(CO)_8$ functions as the best catalytic agent of the group, producing high yields with relatively low concentrations. Dicobalt octacarbonyl is commercially available and is prepared by processes well known in the art. The preferred and convenient range for the carbonyl catalyst was found to be from about 0.4 to about 4.0 mole percent, based on the weight of the heterocyclic compound.

A factor to be taken into consideration is the stability of the particular carbonyl catalyst employed, which ordinarily will decrease rapidly with an increase in temperature. The stability will be dependent upon the combined effect of temperature and pressure, the higher the temperature used, the higher the pressure required to keep the carbonyls from decomposing; for example, dicobalt octacarbonyl requires a pressure of about 600 lbs. per square inch if a temperature of 150° C. is maintained. Accordingly, the preferred conditions for the reactions constituting the processes of this invention are preferably at pressures between 800 and 5,000 lbs. per square inch and temperatures between 80° C. and 300° C. Generally, the higher pressures tend to produce the higher yields of products until a maximum is reached. A highly useful range applicable to many reactions involved in this invention is 2,500–4,000 lbs. per square inch, a range especially suited for the synthesis of the alkyl β-aminopropionates.

Care should also be exercised that the temperature of the reaction not exceed the decomposition point of either the starting compound or the products. If the catalyst employed for a particular reaction is unusually effective, good yields may be obtained at lower temperatures and pressures than would be the case were a less active catalyst used. The duration of the reaction, is, of course, a vital factor in determination of eventual yields. In view of the range of components that can be used as starting materials, the intervals of time necessary to produce satisfactory yields will vary within wide limits, but generally a period of at least one hour is required for a reaction. Prolongation does not necessarily automatically increase yields, for when a reaction is continued for extended periods of time, the danger exists that, under the influence of an active catalyst and high pressures, the reaction products will condense either with themselves or with the starting compound, or that other secondary and undesirable reactions will occur.

In the generally preferred method of practising this invention, ethylenimine, or a derivative compound of ethylenimine, an active hydrogen donor compound (easily replaceable hydrogen), and a solution of the metal carbonyl catalyst in an inert solvent such as petroleum ether or benzene are placed in a pressure resistant vessel, which is flushed with nitrogen and then charged with carbon monoxide to the pressure desired. Means for agitating the reaction mixture are employed and the temperature of the mixture is raised to the desired level and maintained for a time sufficient to produce satisfactory yields. On cooling, the reaction products are removed and the solvent is distilled off. The products are then separated by fractional distillation or extraction. The metal of the catalyst can be recovered from the residue following distillation. The recovered metal can be reheated and reacted with carbon monoxide to yield the carbonyl catalyst.

The following examples, while limited to only a few of the reactions possible under this invention, are not to be construed as limiting the scope of the invention.

EXAMPLE 1

Into a high pressure tubular autoclave fixed on a rocking assembly was added 1.0 mole of 2-methylethylenimine, 243 ml. (6.0 moles) of methanol, and 8.0 g. (0.023 mole) of dicobalt octacarbonyl dissolved in 100 cc. of petroleum ether, boiling point 80–100° C. The autoclave was then sealed, flushed first with nitrogen, then with carbon monoxide and finally charged with carbon monoxide to a pressure of 3,500 lbs. per square inch. Rocking was started and heat applied until a temperature of 150° C. was reached. The temperature was maintained at 150° C. for four hours. The autoclave was allowed to cool to room temperature and the reaction mixture removed. The petroleum ether and unreacted methanol were removed under vacuum. The higher boiling reaction products were fractionated under reduced pressure, the methyl β-aminobutyrate being distilled off at 55–60° C. at a pressure of about 15 mm. The methyl β-aminobutyrate recovered analyzed to a purity of 96% and represented a yield of 60%.

EXAMPLE 2

A reaction mixture composed of 1.0 mole of ethylenimine, 3 moles of water, and 0.04 moles of dicobalt octacarbonyl dissolved in 300 cc. of petroleum ether was placed in the autoclave, sealed, flushed with nitrogen then with carbon monoxide. Finally the autoclave was charged with carbon monoxide to a pressure of 3,400 lbs. per square inch. Heat and rocking were applied until a temperature of 150° C. was reached. This temperature was maintained for four hours. After cooling to room temperature, the reaction mixture was removed and the petroleum ether was then stripped under vacuum. The residue was dissolved in water and on recrystallization the whitish crystals of β-alanine were collected in a yield of 55%.

EXAMPLE 3

A mixture composed of 1.0 mole of 2-phenylethylenimine, 1.0 mole of normal butylamine and 0.04 mole of rhodium octacarbonyl dissolved in 100 cc. of petroleum ether was placed in the autoclave and, using the previous technique, charged to a pressure of 3,500 lbs. per square inch with carbon monoxide. The temperature was brought to 150° C. and maintained for 20 hours. After cooling, the solvent was removed and the residue extracted to yield a fraction identified as β-phenyl-β-amino N-butylpropionamide. This fraction, analyzed for the amide, represented a yield of 33% based on the starting material.

EXAMPLE 4

A reaction mixture of 1.0 mole of ethylenimine, 4.5 moles of benzyl alcohol and 0.04 mole of rhodium octacarbonyl dissolved in 100 cc. of petroleum ether was placed in the autoclave and, using the usual technique, was charged with carbon monoxide to a pressure of 5,000 lbs. per square inch. A temperature of 125° C. was maintained in the reaction chamber for 19 hours. After cooling, the petroleum ether was removed and extraction of the reaction products with ether gave a fraction identified as benzyl-β-aminopropionate. The ester represented a yield of 35%.

EXAMPLE 5

A reaction mixture of 1.0 mole of 2-methylethylenimine, 1 mole of methyl mercaptan and 0.04 mole of iridium carbonyl dissolved in 300 cc. of petroleum ether was placed in the autoclave, flushed with nitrogen, then with carbon monoxide and finally charged with carbon monoxide to a pressure of 3,500 lbs. per square inch. Rocking was initiated and a temperature of 225° C. was maintained in the mixture for 7 hours. The reactor was cooled and the products removed. Work-up by distillation and extraction gave as product the thiolester of methyl β-aminobutyrate.

EXAMPLE 6

1.0 mole of ethylenimine and 0.03 mole of dicobalt octacarbonyl were charged into a high pressure autoclave and pressurized to 600 lbs. per square inch with a 1:4 carbon monoxide and hydrogen mixture. The reactor was then heated at 140° C. for four hours. The reaction product produced a 38% yield of β-aminopropionaldehyde.

What is claimed is:

1. A process for preparing organic nitrogen containing compounds of the group consisting of acids, esters, thiolesters, amides, and aldehydes, which comprises reacting carbon monoxide and an active hydrogen contributing compound selected from the group consisting of water, lower alkyl alcohols, lower alkyl mercaptans, lower alkyl amines, benzyl alcohol, and hydrogen, in the presence of a metal carbonyl catalyst of the group consisting of cobalt, rhodium and irridium at a temperature in the range of about between 80° C. to 300° C. and at a pressure in the range of about between 800 to 8,000 pounds per square inch, with a starting material of an organic compound selected from the group consisting of ethylenimine, lower alkyl substituted ethylenimine and phenyl substituted ethylenimine and recovering the amino compound from the reacted mass.

2. The process of producing β-aminopropionic acid, comprising the steps of mixing ethylenimine and water in the presence of dicobalt octacarbonyl in a closed container, charging said container with carbon monoxide until a pressure of about between 3000 to 5000 pounds per square inch is obtained therein, heating said container to a temperature of about 80° C. to 200° C. for a period in excess of about one hour, cooling the mass, and recovering the β-aminopropionic acid therefrom.

References Cited by the Examiner

UNITED STATES PATENTS 3,161,672  12/1964  Zachry et al. _____ 260—486

OTHER REFERENCES

Elderfield, Heterocyclic Compounds, Volume 1 (1950) John Wiley and Sons Inc., page 71.

Emmett, Catalysis, Volume V (1957) Reinhold Publishing Corporation, pages 61–69.

LORRAINE A. WEINBERGER, *Primary Examiner.*

ALBERT P. HALLUIN, *Assistant Examiner.*